H. B. JOHNSTON.
PISTON AND PISTON RING.
APPLICATION FILED OCT. 15, 1919.
1,330,188.
Patented Feb. 10, 1920.
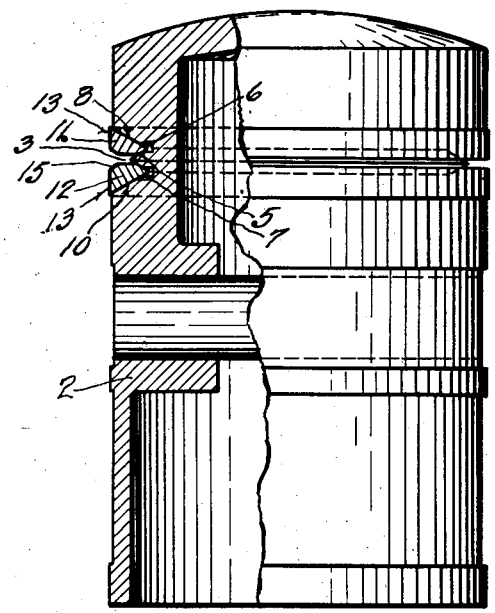
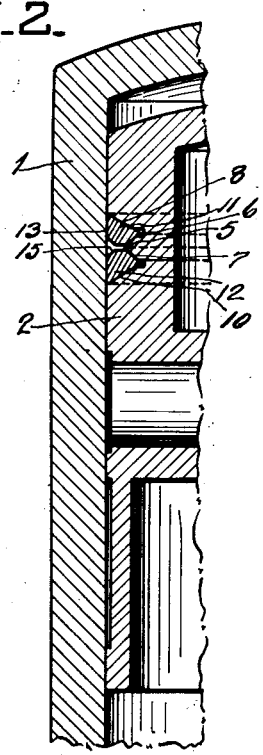
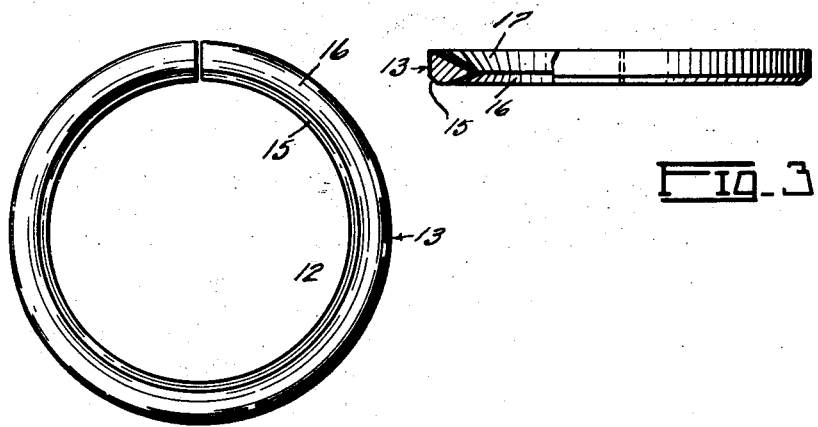
Inventor
HARRY B. JOHNSTON
By his Attorney
Horace Barnes

UNITED STATES PATENT OFFICE.

HARRY B. JOHNSTON, OF SEATTLE, WASHINGTON.

PISTON AND PISTON-RING.

1,330,188.  Specification of Letters Patent.  Patented Feb. 10, 1920.

Application filed October 15, 1919. Serial No. 330,724.

*To all whom it may concern:*

Be it known that I, HARRY B. JOHNSTON, a citizen of the United States, residing at Seattle, in the county of King and State of Washington, have invented certain new and useful Improvements in Pistons and Piston-Rings, of which the following is a specification.

This invention relates to improvements in pistons for steam or internal combustion engines, and to the metallic packing rings therefor.

The object of the present improvements is to provide a piston with packing rings of simple construction whereby a pair of rings may be retained in a single ring-groove of special construction and configuration and wherein the respective rings will be acted upon in turn by the compression forces in the cylinder and in the crank chamber to expand against the cylinder walls and effectively prevent the leakage of gas and power on the gas intake and power strokes of the piston, and avoid the leakage of oil from the crank case on the compression and scavenging strokes of the piston.

These and other objects of the invention will be further described in the following specification, illustrated in the accompanying drawings, and the novel features of the invention will be finally set forth in the appended claims.

In said drawings, Figure 1 is a view in side elevation, partly in section, of a piston and rings mounted thereon, illustrating the same when removed from a cylinder of an engine. Fig. 2 is a fragmentary view in cross-section of the same illustrating their positions when mounted within a cylinder. Fig. 3 is a view in side elevation, partly in section, of one of the rings detached. Fig. 4 is a plan view of the same.

Referring to said views, the reference numeral 1 indicates the side walls of an engine cylinder and 2 a piston mounted for operation therein. Said piston is formed in proximity of its upper end with a two-part annular ring-receiving groove 3 which, in effect, may be formed as of two V-shaped grooves whose adjacent sides intersect at approximately one-half their depth, leaving a salient angular V-shaped projection 5 dividing the two groove parts, the numeral 6 denoting the upper groove-part and 7 the lower. The upper inclined wall 8 of said groove-part 6 and the lower wall 10 of groove-part 7, extend from the base of the projection 5 on either side in straight lines to the periphery of the piston.

The piston rings 11 and 12 are of corresponding form to fit the groove sections 6 and 7 respectively. Considering the rings in detail, it will be noted that there are two faces on each ring which conform to the outer inclined walls 8, 10 of the groove and the walls of the V-shaped projection 5, respectively. In the preferred embodiment of my invention, the rings have adjacent faces which lie in parallel planes. These faces, while of the same size and shape, on the adjacent rings, are spaced apart from each other. Between the outer cylindrical surface 13 of the ring and the face lying adjacent the other ring is a chamfered or beveled portion 15.

The rings are so shaped and proportioned that when they are installed in the groove sections a space will remain between the two adjacent faces of the respective rings. There is also a space at the bottom of each groove part to provide for any carbon or oil which may get between the ring faces and the groove walls.

In operation, when the pressure due to the expansion of gases within the cylinders takes place, the rings will be acted upon by the compressed gases entering between the rings and forced outwardly against the cylinder walls due to the reaction of the inclined faces with the upper wall of the base 5 and wall 10, but the latter will exert the most resistance and act reliably to force the lowermost ring 7 into close contact with the cylinder wall. On the opposite strokes of the piston, the rings will be oppositely acted upon and the upper ring 6 will serve to prevent the leakage of oil into the cylinders.

Having described my invention, what I claim, is—

1. A piston having a two-part ring-receiving-groove formed by two V-shaped grooves intersecting at approximately their mid-depths, and with recesses at their vertexes.

2. A piston having a two-part ring-receiving-groove formed by the intersection of two V-shaped groove parts and having a V-shaped projection at the bottom of the groove extending approximately to one-half the depth of the groove.

3. A piston having a ring receiving groove having two V-shaped ring receiving sections, the adjacent sides of said sections intersecting at a line within the peripheral lines of the cylinder.

4. A piston having a ring receiving groove having two V-shaped ring receiving sections, the adjacent sides of said sections intersecting at a line within the peripheral lines of the cylinder, a piston ring in each of the groove sections having inclined faces to correspond to the walls thereof and separated at their adjacent sides.

Seattle, Washington, Oct. 10, 1919.

HARRY B. JOHNSTON.